May 3, 1932.  A. I. McGLOUGHLIN  1,857,061
AUTOMOBILE BODY
Filed Nov. 21, 1930  2 Sheets-Sheet 1
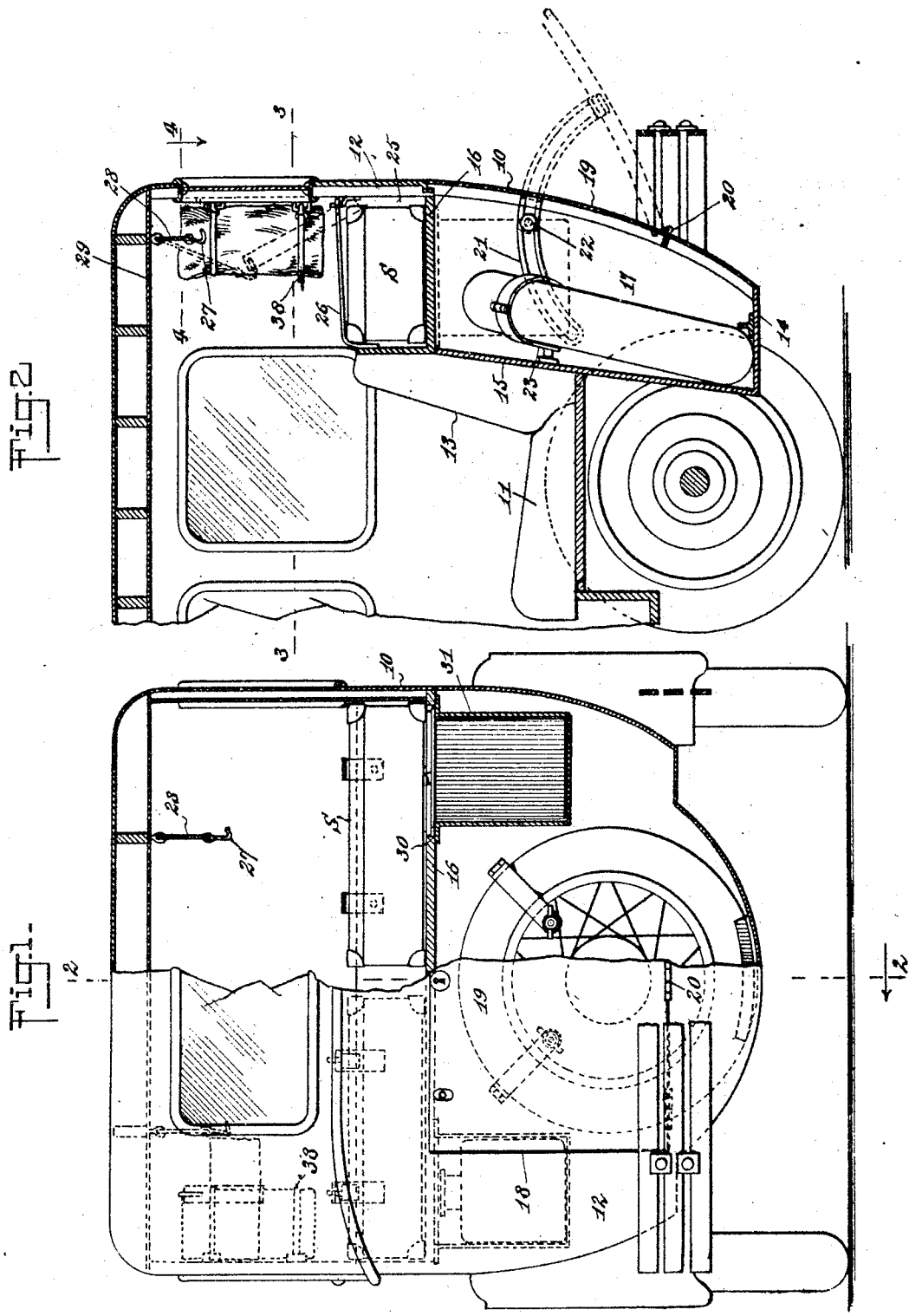
WITNESSES
William P. Goebel
Hugh H. Ott
INVENTOR
ALFRED I. McGLOUGHLIN
BY
ATTORNEYS May 3, 1932. A. I. McGLOUGHLIN 1,857,061
AUTOMOBILE BODY
Filed Nov. 21, 1930 2 Sheets-Sheet 2
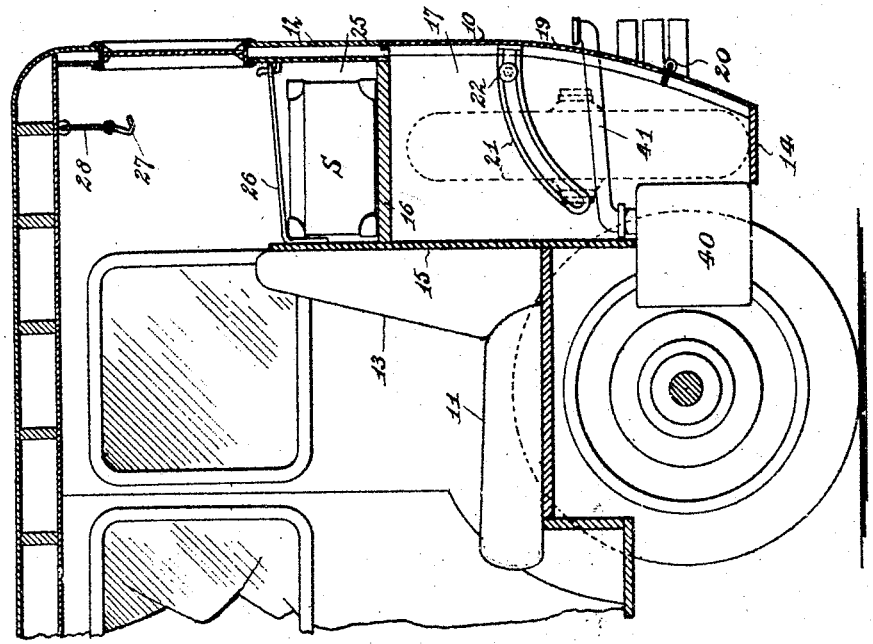
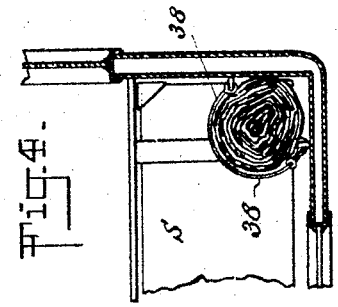
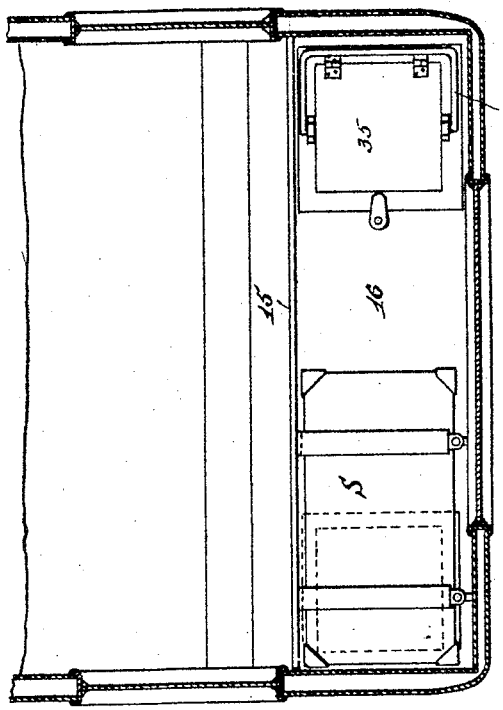
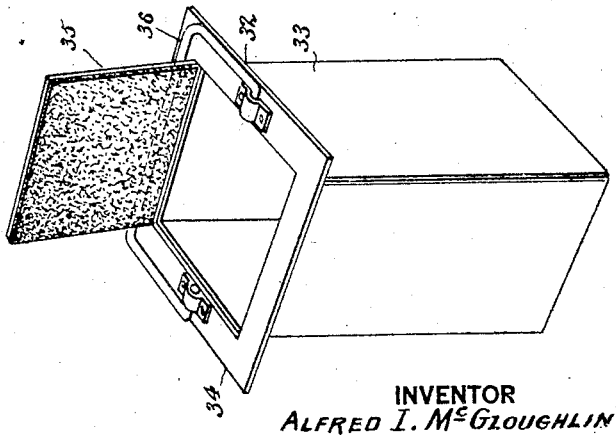
WITNESSES
INVENTOR
ALFRED I. McGLOUGHLIN
BY
ATTORNEYS Patented May 3, 1932

1,857,061

UNITED STATES PATENT OFFICE

ALFRED I. McGLOUGHLIN, OF NEW YORK, N. Y.

AUTOMOBILE BODY

Application filed November 21, 1930. Serial No. 497,293.

This invention relates to vehicles, and has more particular reference to an improved body construction for automobiles of the closed model types, such as sedans, coaches or the like.

The invention broadly comprehends an improved body construction which, without increasing the wheel base or otherwise altering or affecting the chassis construction, afford within the confines of the body, a convenient and closed carrying space for spare tires, wheels, baggage, luggage, loose apparel or other articles, all of which, by virtue of said body construction, are protected against theft, as well as road dust or the elements, while being readily accessible when access thereto is desired.

The invention further aims to provide an improved vehicle body construction of the indicated character which is not unduly complicated, which does not materially add to the cost of production of the body or increase the weight of the vehicle, and which does not detract from its appearance while greatly adding to the general efficiency thereof.

With the above recited and other objects in view, reference is had to the following description and accompanying drawings, in which there are exhibited several examples or embodiments of the invention, while the claims define the actual scope of the same.

In the drawings:

Figure 1 is a rear view of an automobile having a body constructed in accordance with the invention, a part thereof being broken away and shown in section to disclose the underlying structure.

Figure 2 is a fragmentary longitudinal sectional view taken approximately on the line indicated at 2—2 in Figure 1 of the drawings.

Figure 3 is a fragmentary sectional plan view taken approximately on the line indicated at 3—3 in Figure 2.

Figure 4 is a detail fragmentary sectional view taken approximately on the line 4—4 of Figure 2.

Figure 5 is a perspective view of one of the removable receptacles removed from the vehicle and shown in its opened condition.

Figure 6 is a fragmentary longitudinal sectional view similar to Figure 2, illustrating the application of the improved body construction to a vehicle of a slightly different type.

Referring to the drawings by characters of reference, and particularly to the type of vehicle illustrated in Figures 1 and 2, in which the fuel tank is arranged at a point thereon at the rear of the vehicle, the improved body construction consists in extending the side walls 10 rearwardly beyond the rear seat 11 so as to space the rear wall 12 of the body an appreciable distance beyond the back rest 13 of the rear seat 11. The side walls 10 and the rear wall 12 are also extended downwardly a greater distance than ordinarily and are connected with or merge into a bottom wall 14. A forwardly spaced wall 15 extends downwardly from a point directly in rear of the back rest 13 of the rear seat and is joined to or merges into the bottom wall 14 and side walls 10. A horizontal partition element 16 disposed in a plane below that of the upper edge of the back rest 13 extends from said back rest 13 to the rear wall 12, and the partition 16, together with the walls 10, 12, 14 and 15, defines a storage compartment 17 for a spare tire or tires or a spare wheel or wheels. In practice, the rear wall 12 is formed with an opening 18 constituting a doorway for gaining access to the storage compartment 17 for introducing the tires, wheels or other articles thereto or removing the same therefrom. A door 19 is hinged as at 20 and is designed to normally close the doorway 18, to render the storage compartment 17 dustproof and weather tight. Obviously, the door 19 may be locked by a key actuated lock to secure the articles contained in the storage compartment against theft. In practice, the door may be provided with means for limiting its opening movement, such as the arcuate slotted element 21 attached to the door 19 and cooperating with a pin 22 carried by a stationary part of the vehicle. Within the storage compartment 17, suitable wheel or tire supporting brackets 23 may be provided for carrying and rigidly maintaining the same in place.

The upper surface of the partition 16, together with the rear of the back rest 13 and the rear wall 12, defines a well or depression 25 which opens at its upper end to the interior of the vehicle and within which suitcases, hand bags or other luggage S may be conveniently carried by resting the same on the upper surface of the partition element 16, which serves in this capacity as a platform. Straps or tapes 26 may be permanently attached at one end and detachably connected at the other end to extend across the upper portion of the compartment 25 for the purpose of preventing displacement of the articles S therefrom, due to road shocks and jars when the vehicle is in transit. If desirable, hooks 27 may be suspended by flexible and elastic elements 28 from the ceiling 29 of the vehicle to engage with and hold up the cover of a suitcase in the manner illustrated in dotted lines in Figure 2 whereby the occupants of the vehicle may gain access to the suitcase without the necessity of leaving the vehicle and while said suitcase is supported within the compartment 25.

The partition 16 adjacent the opposite side walls 10 may be provided with openings 30, from which receptacle holders 31 depend into the unoccupied space of the storage compartment 17, and which receptacle holders may receive receptacles such as indicated by the reference character 32. As shown, the receptacles 32 include a body 33 having a marginal flange 34 at the upper open end and a closure or cover 35 which is displaceable therefrom, together with a bail or handle 36 which is fulcrumed thereon to afford means for lifting the receptacle from the holder or placing the same therein. The receptacle may be employed for the purpose of carrying food or other contents, to which access may be gained from the interior of the vehicle without the necessity of leaving the same.

As a further feature, the rear corners of the vehicle body may be provided with angularly disposed horizontal elastic strips 38 for carrying rolled articles, such as sweaters, cloaks, blankets or the like.

As illustrated in Figure 6 of the drawings, the body construction is shown as applied to the type of vehicle in which the fuel tank 40 is supported at the rear, and in this instance the fuel tank may partially extend into the storage compartment 17 with a filler pipe 41 exposed from the rear of the compartment as illustrated. In other respects, the construction and general arrangement are identical with that of the previously described form of the invention.

From the foregoing, it will thus be seen that an improved body construction for automobiles such as sedans or coaches has been devised, by virtue of which a convenient and closed carrying space or spaces are afforded for various articles, whereby the same are protected against theft, as well as road dust or the elements.

While there have been illustrated and described certain preferred embodiments of the invention, it is to be clearly understood that no limitation is intended to the precise structural details, but that variations and modifications which properly fall within the scope of the appended claims may be resorted to when found expedient.

What is claimed is:

1. In an automobile of the sedan type, a body fashioned to provide a carrying space in rear of the rear seat, extending from the roof to a plane below the usual bottom line of the vehicle body and across the entire width of the vehicle and a horizontal partition disposed in a plane below that of the upper edge of the rear seat back rest and extending therefrom to the rear wall and subdividing said carrying space into upper and lower compartments, the former being open to the interior of the body and the latter having a doorway opening through the rear wall of the body and a door normally closing said doorway, said partition having an opening at one side of its transverse center and a receptacle holder depending from said opening into the lower compartment for the reception of a removable receptacle.

2. In an automobile body construction of the sedan type, means defining an article carrying space disposed in rear of the rear seat, extending from the roof to a point below the usual bottom line of the vehicle body and across the complete width of said vehicle and a horizontal partition disposed in a plane below that of the edge of the rear seat back rest and subdividing said carrying space into upper and lower compartments, the upper compartment being open to the interior of the body and one of the lower compartments being positioned at the transverse center of the body for the storage of tires and/or wheels and adapted to be opened to the exterior of the body for gaining access thereto, said horizontal partition having openings therein at each side of the centrally-positioned compartment for access to the other of said lower compartments, each of said latter compartments having a removable receptacle therein, the tops of said receptacles filling said partition openings when positioned and serving as part of the bottom of the upper compartment.

ALFRED I. McGLOUGHLIN.